United States Patent
Schmiegel et al.

(10) Patent No.: US 9,099,893 B2
(45) Date of Patent: Aug. 4, 2015

(54) POWER CONTROL DEVICE FOR A POWER GRID, COMPRISING A CONTROL UNIT FOR CONTROLLING AN ENERGY FLOW BETWEEN THE POWER GENERATION UNIT, THE ENERGY STORAGE UNIT, THE CONSUMER UNIT AND/OR THE POWER GRID

(75) Inventors: Armin Uwe Schmiegel, Hamburg (DE); Ralf Bueppelmann, Hamburg (DE); Stefan Dieter Heimfarth, Waldsolms (DE)

(73) Assignee: voltwerk electronics GmbH, Hamburg (DE)

( * ) Notice: Subject to any disclaimer, the term of this patent is extended or adjusted under 35 U.S.C. 154(b) by 446 days.

(21) Appl. No.: 12/875,942

(22) Filed: Sep. 3, 2010

(65) Prior Publication Data

US 2011/0060474 A1 Mar. 10, 2011

(30) Foreign Application Priority Data

Sep. 4, 2009 (DE) .......................... 10 2009 040 090

(51) Int. Cl.
*G06F 19/00* (2011.01)
*H02J 3/38* (2006.01)
*H02J 7/35* (2006.01)

(52) U.S. Cl.
CPC .. *H02J 3/383* (2013.01); *H02J 7/35* (2013.01); *Y02E 10/563* (2013.01); *Y02E 10/566* (2013.01)

(58) Field of Classification Search
CPC ...................................................... G06F 19/00
USPC .............. 700/291, 296, 297; 307/20; 136/244
See application file for complete search history.

(56) References Cited

U.S. PATENT DOCUMENTS

| 7,783,390 B2* | 8/2010 | Miller .......................... 700/291 |
| 2003/0047209 A1* | 3/2003 | Yanai et al. ................... 136/291 |
| 2009/0027932 A1* | 1/2009 | Haines et al. ................... 363/95 |

(Continued)

FOREIGN PATENT DOCUMENTS

| EP | 1 848 085 A2 | 10/2007 |
| GB | 2 455 421 A | 6/2009 |

(Continued)

OTHER PUBLICATIONS

German Search Report of Sep. 4, 2009 (4 pages).

*Primary Examiner* — Tejal Gami
(74) *Attorney, Agent, or Firm* — Kilpatrick Townsend & Stockton LLP (57) ABSTRACT

The invention relates to a power control device for a power grid and to a method for controlling the operation of a power control device. To allow a consumer unit connected to the power control device to be supplied with energy in an optimized manner in accordance with its requirements, a power control device according to the invention is proposed, said device comprising a power generation unit, in particular a photovoltaic unit, for generating power from renewable resources, an energy storage unit for storing energy, a load connection unit for connecting the power control device to a consumer unit for consuming energy, a grid unit, in particular an inverter unit, for connecting the power control device to a power grid, for drawing energy from the power grid and for feeding energy into the power grid, and a control unit for controlling a flow of energy between the power generation unit, the energy storage unit, the consumer unit and/or the power grid.

21 Claims, 7 Drawing Sheets

(56) References Cited

U.S. PATENT DOCUMENTS

2009/0234757 A1* 9/2009 Tarbell et al. .................. 705/30
2010/0174418 A1* 7/2010 Haugh .......................... 700/295

FOREIGN PATENT DOCUMENTS

| WO | WO 02/39563 A1 | 5/2002 |
| WO | WO 2008/125696 A2 | 10/2008 |

* cited by examiner

POWER CONTROL DEVICE FOR A POWER GRID, COMPRISING A CONTROL UNIT FOR CONTROLLING AN ENERGY FLOW BETWEEN THE POWER GENERATION UNIT, THE ENERGY STORAGE UNIT, THE CONSUMER UNIT AND/OR THE POWER GRID

CROSS-REFERENCE TO RELATED APPLICATIONS

This application claims the priority of German Patent Application No. 10 2009 040 090.7, filed Sep. 4, 2009, the disclosure of which is herein incorporated by reference.

The present invention relates to a power control device for a power grid and to a method for controlling the operation of a power control device.

Power control devices, for example ones that supply electrical power to a household, as consumer unit (or "load unit"), are well known. Such a power control device has a power generation unit, such as a photovoltaic system, which generates energy from renewable resources, such as solar insolation, and which supplies that energy to the household. When the photovoltaic system generates a substantial amount of energy, for example when weather conditions are good, the household is supplied with sufficient electrical power. When the photovoltaic system generates less energy than the household consumes, for example at night or when weather conditions are poor, the household needs to cover its energy requirements from the (public) power grid. For this purpose, the power control device has a grid connection unit by means of which the power control device may be connected to the power grid in order to draw this energy. This connection also permits the power control device to release energy that it generates to the power grid when the photovoltaic system generates more energy than is consumed by the household.

The disadvantage of such a power control device is that it is complicated to exchange energy between the power control device and the power grid. More specifically, each flow of energy between the power control device and the power grid must be accounted for, which involves complicated calculation methods, inter alia.

DE 100 18 943 A1 describes a photovoltaic inverter in which all the energy sources and energy sinks required for a standalone photovoltaic system are coupled via converters solely to a DC bus having a freely chosen voltage level, and in which these components are regulated or controlled by evaluating the voltage level of the DC bus. This is done by interconnecting a photovoltaic generator via a DC-DC converter, a bidirectional charge controller with a battery and a standalone inverter to the consumer via a DC bus, and by connecting a control and regulation device that performs energy management by evaluating the voltage level of the DC bus.

Problems with the layout of DE 100 18 943 A1 relate to the limited load balancing and in particular to accounting aspects.

A load management controller that distributes electrical energy from a power generation unit among a plurality of electrical load sub-circuits is known from WO 2008/125696 A2. Surplus energy that is generated can be supplied to a storage circuit. If the energy requirement of the sub-circuits rises above the supply capacity of the power generation unit, additional electricity is drawn from the public grid. For this purpose, the flow of electricity from the public grid and from the power generation unit are combined and jointly fed to a main switchboard. The latter distributes the electrical energy to the load sub-circuits. Similar solutions are known from GB 2455421 A and EP 1 848 085 A2.

Although it is possible to supply several consumers of a household with a continuous supply of electricity with these prior art solutions, the disadvantage of these prior art solutions, however, is that the efficiency achieved is not sufficient when unforeseen fluctuations in consumption or supply occur. These known solutions either fail to provide sufficient temporal resolution of the normal relationship between grid power and internally generated power, or it is necessary to adjust a switch based on stored forecast data on consumption. However, this results in losses of energy. Another disadvantage is that, as a result of these prior art solutions, loads are placed on the public grid because there is no reliable way of preventing energy being fed into the public grid, even though it has an oversupply of energy, or energy being drawn from the public grid even though it exhibits an undersupply of energy.

The object of the invention is to provide a power control device that avoids the disadvantage mentioned above. More specifically, one aim of the invention is to provide a power control device that is optimized for maximum efficiency of a standalone power grid.

According to the invention, the object is achieved by means of a power control device for a standalone grid system, the power control device comprising a power generation unit, in particular a photovoltaic unit, for generating power from renewable resources, an energy storage unit for storing energy, a measuring device for measuring the energy consumption of a consumer unit for the consumption of energy, a grid connection unit, in particular an inverter unit, for connecting the power control device to a power grid, for drawing energy from the power grid and for feeding energy into the power grid, and a control unit for controlling a flow of energy between the power generation unit, the energy storage unit, the consumer unit and/or the power grid. According to the invention, the control unit is adapted to control the amount of energy that is fed into the power grid depending on the amount of energy that is consumed by the consumer unit.

According to the invention, an optimized supply of energy that matches requirements is made possible by the control unit preferably controlling the flow of energy between the power control device and the power grid in such a way that a first amount of the energy that the consumer unit draws from the power generation unit within the standalone system and consumes is substantially equal to a second amount of the energy that the consumer unit draws from the power grid and consumes. Energy surpluses within the power control device are stored in the energy storage unit so that the amounts of energy provided internally and externally are kept in balance at times when the power generation unit provides too little energy for the consumer unit.

One advantage of the invention is that all the loads within the standalone grid are connected as a single consumer unit and hence via a single consumer line to the control unit. For this reason, there is no need for differentiated connection of several different consumer units to the control unit, or for separate recording of consumption, with corresponding allocation of different kinds of energy to individual consumer units.

This is advantageously achieved by the control unit controlling the fluctuating amounts of energy supplied to and drawn from the grid according to the amount of current involved. This permits the mixture of electricity drawn from the public grid and the electricity supplied from the power generation unit to be systematically controlled. In this way, a frequency of control is reached in which one control operation is performed within a few seconds, or indeed several control operations are performed per second, with the result that losses are significantly reduced.

It is also advantageous when a signaling link is provided between the power generation unit and the control unit, in such a way that only exactly the amount of energy required by the consumer unit is fed from the power generation unit to an inverter, and that any additional energy generated is fed directly to the storage unit without passing through the inverter. For this purpose, a direct DC connection which can be regulated can be established between the power generation unit and the storage unit, via the control unit, in order to permit in this way a highly loss-free transmission of energy.

In the same way, the power control device according to the invention makes it possible to feed in a regulated amount of energy into the public grid via the inverter, and to supply a different amount of energy directly as DC current to the storage unit.

It is also advantageous that not only the power generation unit, but also the consumer unit, the storage unit and the public grid are connected directly to the control unit without an intermediate inverter or rectifier having to be provided therebetween. Because of this, the control unit can optimally regulate the flow of electricity between these units, if necessary feed electricity drawn from the power generation unit and intended for the consumer unit or the public grid to the inverter unit, in order to feed it subsequently as AC current to the loads and/or to the public grid and, if necessary, feed electricity drawn from the public grid to a rectifier in order to feed it to the storage unit. However, the control unit is also able to feed electricity from the public grid directly to the consumer unit and to feed electricity from the power generation unit directly to the storage unit, without the electricity passing through a rectifier or inverter.

It should be understood, as a basic principle, that the storage unit may be provided as a central storage unit disposed in the region of the power generation unit or of the control unit. In certain cases, however, the storage unit may also be part of a specific load within the consumer unit and in particular may be configured as an accumulation of several such storage units.

The power control device according to the invention preferably allows limitations to be placed on the grid feeding power. This limiting of grid feeding power can be achieved according to the invention by storing in the storage unit any electrical power from the power generation unit that exceeds the sum of the electrical power consumed by the consumer units and the maximum amount of power to be fed into the public grid on the basis of this limitation. In the case of a multiphase public grid, the power control device according to the invention also allows the grid feeding power to be limited by phase, for example by feeding such surplus power or energy on phases for which an infeed limit has not yet been reached, and by not feeding in any further power on phases for which the infeed limit has already been reached.

This is advantageously achieved by the storage unit, which operates in rapid charge/discharge cycles, and by rapidly switching between the various power generation units (internally to the power control device and externally (i.e. in the power grid)), or indeed with mixed operation of these energy sources.

The present invention allows the two energy sources, i.e. the power generation unit within the power control device and the power generation unit within the power grid, to be used in optimized, mixed operation. By means of a predictor unit, losses due to start-up or shut-down of the consumer unit (or consumer units) can be detected and compensated by the system. Mixed operation of the internal and external power generation units removes restrictions with regard to the use of loads.

Due to the present invention, there are hardly any limitations on using the consumer unit (or consumer units), since energy is available not only from the internal but also from the external power generation unit. Furthermore, the energy from the internal power generation unit is consumed in an optimal way.

The control unit is preferably adapted to bring about a flow of energy from the power generation unit to the energy storage unit when the energy produced exceeds the energy consumption of the consumer unit.

What this advantageously achieves is that the control unit decides, according to the momentary (or predicted) energy requirement of the consumer unit, whether energy has to be fed to the storage unit and/or to the power grid. Only in the event of an energy surplus is energy released from the power control device to the power grid. The energy accounting work can thus be reduced.

The control unit is preferably adapted to control a flow of energy from the power generation unit and/or from the energy storage unit to the power grid in an amount that depends on, and is preferably equal to, the amount of energy that is drawn from the power grid by the consumer unit. By this means, a balance can be kept between the amount of energy drawn from and fed into the grid, even when less energy is generated. Another advantage of this configuration is that the energy storage unit always has energy reserves, as far as possible, for supplying the consumer unit with energy.

What this development of the invention achieves is that fluctuations in infeed and withdrawal levels can be largely prevented by virtue of the regulation performed by the inventive control unit, or at least can be kept in balance over a long enough time to match the regulation characteristics of a power station that feeds the public grid. The control unit can thus be adapted in such a way that it achieves equal amounts of grid infeed and power draw from the grid over a period of a few seconds, minutes, or one or more hours, by controlling the flows of energy between the power generation unit, the storage unit, the consumer unit and the public grid. It is also possible, in the same way, to keep a constant ratio between the power draw from the grid and the grid infeed. Temporary variations in the grid can be compensated by this means at the infeed/power draw point, such that a household connected to the public grid via the inventive power control device only needs to alter the power draw or grid infeed when there is an undersupply or oversupply of energy over a protracted period. However, such long-term variability imposes much less strain on the grid and can be absorbed by the public grid itself.

With this development of the invention, it is possible to match the amounts of energy fed into and drawn from the grid at a particular moment in time. In this case, a virtual accounting shell around a household that has a power generation unit, for example a photovoltaic system, and an infeed point and power connection to the public grid is neutral at all times. This configuration can increase the stability of the public grid when an inverter is used that is designed to invert only some of several phases of a home grid connected to a similarly multiphased public grid (for example a single-phase inverter in a three-phase home grid). In such a configuration, the electricity from the power generation unit is fed to the consumer units of the home grid on only one or some phases. The control device according to the invention can then be adapted in such a way, for example, that when one of the other phases (i.e. one of the two other phases in a three-phase power supply system) is undersupplied, this undersupply is compensated by drawing power from the public grid. At the same time, however, electricity is fed into the public grid on the phase(s) supplied by the power generation unit, thus achieving a situation in which the flow of energy into the public grid is equal in amount to the flow of energy drawn from the public grid.

The development of the invention is also advantageous whenever the electricity generated in the power generation unit is inverted by means of a multiphase inverter on all phases of a public grid, for example by means of a three-phase inverter in a three-phase grid. In this case, the power demand caused by the consumer units on the individual phases is subject to continual fluctuations, which can lead to different loads on the different phases. At the same time, there may also be imbalances in the public grid in the supply of power on the individual phases. In such situations, the control device according to the invention can improve the stability of the public grid by neutral power draw and infeed. Overloading on a phase that is heavily used by the consumer units is compensated, for example, by drawing power from the public grid and simultaneously feeding electricity into the public grid on one or several other phases. Simultaneously, or alternatively, an oversupplied phase of the public grid can be relieved by drawing power on this one phase. An undersupplied phase of the public grid can also be supported by one-phase infeed on that one phase from the power generation unit or the storage unit.

The control unit is preferably adapted to provide a flow of energy to the energy storage unit until the energy storage unit is charged completely or to a predetermined degree. It is advantageous that the power control device can always access the energy storage unit as an energy reserve in order to cover the requirements of the consumer unit. A flow of energy from the power grid to the inventive power control device can thus be further reduced.

The control unit preferably has a predictor unit for predicting the flow of energy to be controlled. One advantage of this preferred embodiment is that the flow of energy can be determined according to factors that represent a normal and/or anticipated power generation curve and/or power consumption curve. The storage of energy and the feeding of energy into the power grid can be controlled precisely according to the invention to ensure that the consumer unit is optimally supplied.

The predictor unit is preferably adapted to predict the energy consumption of the consumer unit, in particular on the basis of a reference period and/or of information about times, days or seasons, and/or to predict the energy generated by the power generation unit, in particular on the basis of weather information, reference data and/or measurement data. What this advantageously achieves is that the power generation curve can be predicted very precisely, as a result of which a flow of energy can be planned accordingly in advance the flow of energy between the power grid and the power control device can be further reduced.

It is also preferred that the energy storage unit be connected by means of a first capacitor unit and a second capacitor unit to the power generation unit and to the grid connection unit. This development of the invention advantageously achieves a symmetrization and load reduction even in the case of asymmetric loads. The first and second capacitor units can each comprise one capacitor or a plurality of capacitors. Hence, the working conditions of the power control device according to the invention are not limited to symmetrical consumer units; instead, the second capacitor unit permits symmetrization and load reduction for asymmetric consumer units. It is preferred in this regard when the power control device further comprises a charge controller for regulating the charging of an energy storage unit, wherein said charge controller comprises the first capacitor unit and is connected by means of the second capacitor unit to the power generation unit and to the grid connection unit. The advantage of this arrangement of the first and second capacitor units according to the invention is that symmetrization and load reduction can be achieved for asymmetric loads.

The energy storage unit preferably comprises at least one lithium-ion storage element and/or at least one redox-reaction storage element. Such storage elements has especially good characteristics, such as long service life, low life-cycle costs, higher total efficiency, etc. Their use in the power control device according to the invention is therefore particularly advantageous.

It is also preferred that the control unit be adapted to feed such an amount of energy into the power grid as it draws from the power grid, in order to optimize the payment received.

The invention relates, in another aspect, to a method for controlling the operation of a power control device according to any of the preceding claims, comprising the step of controlling an energy flow between the power generation unit, the energy storage unit, the consumer unit and/or the power grid according to the amount of energy consumed by the consumer unit.

It is preferred that the method further comprises the steps of: controlling a flow of energy from the power generation unit to the energy storage unit if the energy produced exceeds the energy consumption of the consumer unit.

It is preferred that the method further comprises the step of:
controlling a flow of energy to the energy storage unit until the energy storage unit is charged completely or to a predefined charge state.

It is preferred that the method further comprises the step of:
predicting the energy consumption of the consumer unit, in particular on the basis of a reference period and/or of information about times, days or seasons, and/or
predicting the energy generated by the power generation unit, in particular on the basis of weather information, reference data and/or measurement data, and
controlling the flow of energy according to the predicted energy consumption and/or the predicted amount of energy generated.

The method can be further developed by feeding an amount of energy from the power generation unit and/or the energy storage unit into the power grid that matches the amount of energy consumed by the consumer unit.

Finally, it is preferred that such an amount of energy is fed into the power grid as is drawn from the power grid.

The advantages described in the foregoing with reference to the inventive power control device apply analogously.

The invention shall now be described with reference to preferred embodiments and to the Figures, in which.

Figure 1:
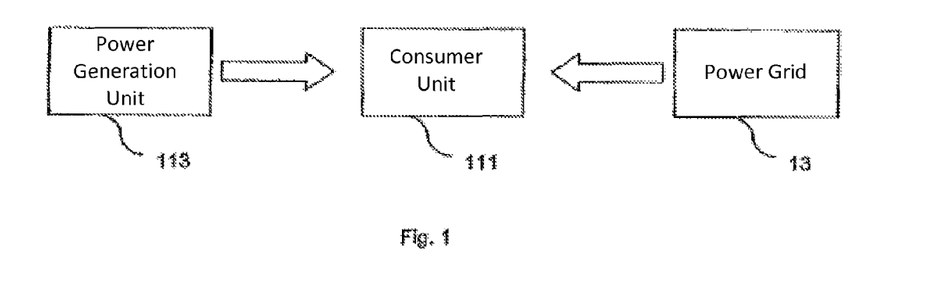
FIGS. 1 and 2 show schematic overviews of a conventional energy flow between a power control device and a power grid.

FIG. 1 illustrates the flow of energy from power generation unit 113 or power grid 13 to consumer unit 111. Power generation unit 113 is a time-dependent, fluctuating and only partially predictable energy source, such as a photovoltaic (PV) system or a wind turbine. For environmental reasons, the production of energy by power generation unit 113 from renewable resources such as sunlight or wind has priority over the energy produced, for example in a coal-fired power station, by power grid 13. In contrast, power grid 13 generates the energy constantly over time and in a predictable manner. Load unit 111 is a time-dependent, fluctuating and only partially predictable load, such as a private household or a small enterprise.

Load unit 111 and power generation unit 113 are included in a power control device. It is technically and financially advantageous for the operator of the power control device if the flow of energy between the power control device and power grid 13 is minimized. In other words, it is advantageous for the load operator to consume energy from power generation unit 113, but not from power grid 13. However, since power generation unit 113 generates energy in a time-dependent, fluctuating and only partially predictable manner, there may be times when there is a surplus of energy and other times when there is a demand for energy on the part of consumer unit 111 of the power control unit. If such an energy requirement exists, consumer unit 11 is compelled to draw energy from power grid 13. If an energy surplus exists, the consumer unit is unable to dissipate it.

Figure 2:
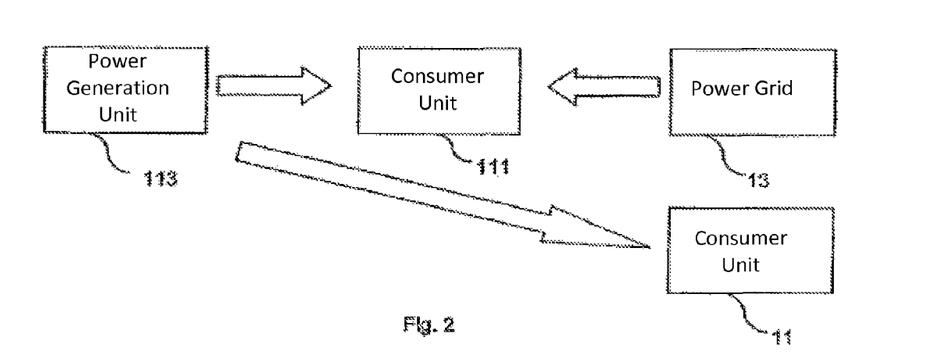

In order to divert the surplus energy, a consumer unit 11 is required that acts as an energy sink for the power grid and which pays accordingly for this supplied energy, as illustrated in FIG. 2. To enable optimal consumption of the surplus energy produced by power generation unit 113, the invention proposes optimized internal consumption according to FIG. 2. Power generation unit 113 may optionally include an energy storage unit that is preferably disposed in the physical proximity of power generation unit 113 and consumer unit 111. The energy storage unit preferably comprises one (or a plurality of) Li-Ion accumulators. In another preferred embodiment, the energy storage unit has a redox system, in order to provide a type of accumulator with high and low dynamic availability. The system shown in FIG. 2 thus provides static balancing of oversupply and undersupply from power generation unit 113: if power generation unit 113 is unable to meet the demand of consumer unit 111, it resorts to power grid 13; surpluses can be fed into the power grid and consumed in consumer unit 11 (and paid for accordingly).

Figure 3:
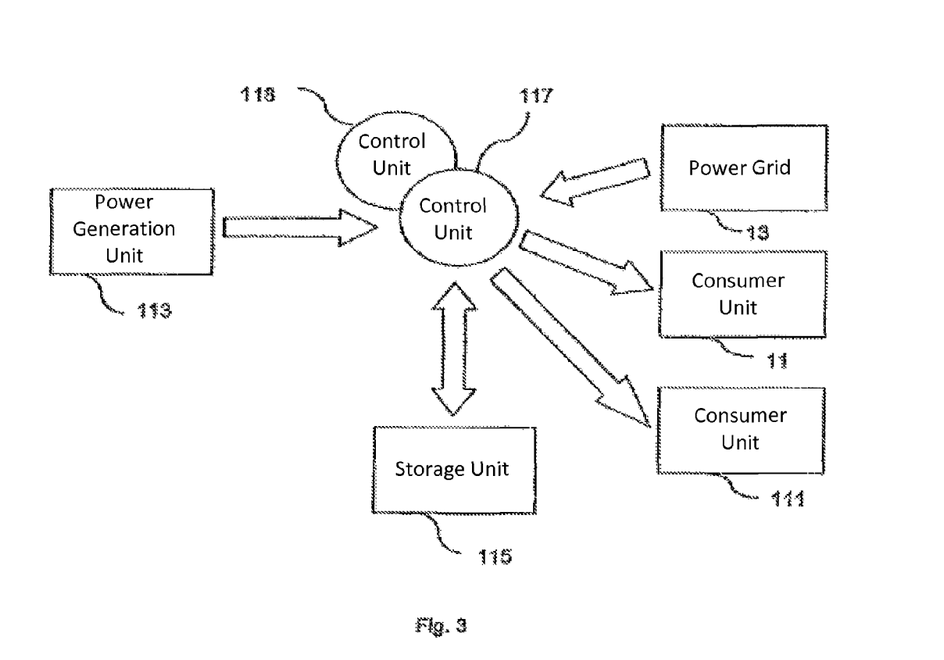
FIG. 3 shows a schematic overview of the power control device according to the invention, and its operation.

FIG. 3 shows a modified version of the scheme in FIG. 2: the flow of energy between the individual components is controlled by control unit 117, which optionally comprises a predictor unit 118. Control unit 117 is adapted to control the following operation: control unit 118 diverts the surplus energy generated by power generation unit 113 to energy storage unit 115 and/or to consumer unit 111. If neither power generation unit 113 nor energy storage unit 113 have sufficient energy in store to cover the energy requirements of consumer unit 111, control unit 117 arranges for the requirements to be covered with energy from power grid 13. If the storage capacity of energy storage unit 115 is not sufficient, it is possible for control unit 117 to divert energy to consumer unit 11. The invention thus allows energy to be used according to requirements. Since source 13 and sink 11 of the power grid are identical, in the case of the public power grid, the energy consumed is purely internal consumption in accounting terms, since the energy from the power generation unit 113 is offset against the balance of power generation unit 113 and the sink or consumer unit 11.

Figure 4:
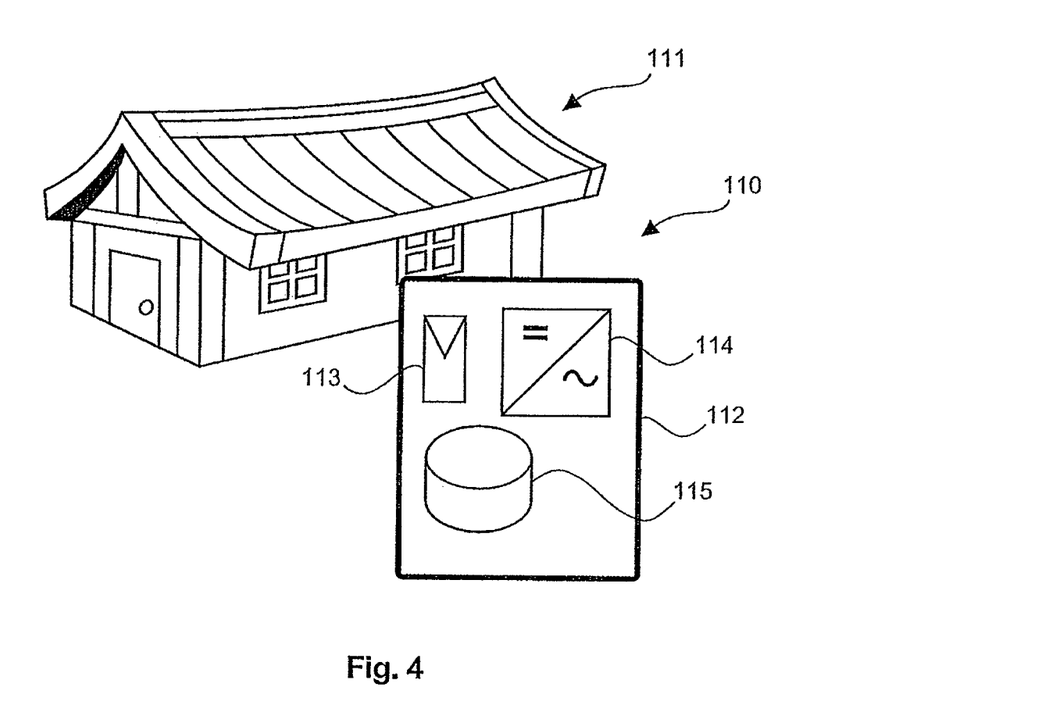
FIG. 4 shows a view of a power control device according to the invention.

FIG. 4 shows a power control device comprising a consumer unit 111 and a standalone power plant 112. Standalone power plant 112 has a power generation unit 113, a grid connection unit, in particular an inverter, 114 and an energy storage unit 115. Power generation unit 113 is preferably a photovoltaic system, although the invention is not limited to the generation of solar power, and can generate power equally well from wind energy, biogas or other renewable resources. A standalone power grid according to the invention has at least one inventive power control device as shown in FIG. 4.

Figure 5:
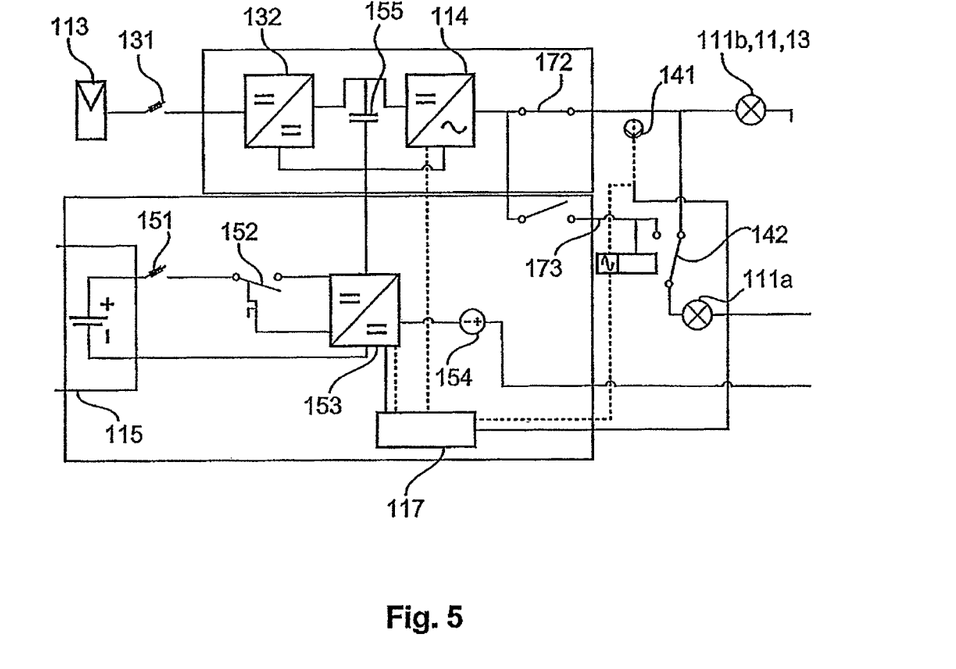
FIG. 5 shows an embodiment of a power control device according to the invention.

An example of how the invention can be implemented is shown in FIG. 5. In this example, the PV system serves as an energy source or power generation unit 113. Grid 11, 13 is shown in the right-hand part of FIG. 5. Charging and accounting of the exchanged energy is carried out in a meter box 141. If the load is more than 5 kWp, consumer unit 111b is connected, whereas if the load is 5 kWp or less, consumer unit 111a is connected.

The inverter (the upper box in FIG. 5) and power management system 117 form the predictor unit and the control unit. The lower box in FIG. 5 is the energy storage box comprising energy storage unit 115.

As long as power generation unit 113 (connected by means of switch 131 and converted by means of PV converter 132) produces sufficient energy, its energy is transmitted directly to the household via inverter 114. If the event of a surplus, this is stored in energy storage unit 115 (connected by means of switches 151 and 152). In the event of a shortage, use is made of energy storage unit 115 and/or grid 13.

FIG. 5 illustrates a backup line 173 which is used to transfer energy directly, in the event of any absence or failure of external power generation unit 13. Backup line 173 is switched reciprocally by switch 172. Switch 142 is used to connect consumer unit 111a to backup line 173.

According to the invention, the energy storage box is coupled to the inverter by the second capacitor 155, which enables symmetrization and load reduction in the case of asymmetric loads. The first capacitor is included in charge controller 153, which is connected to DC power supply 154.

Figure 6:
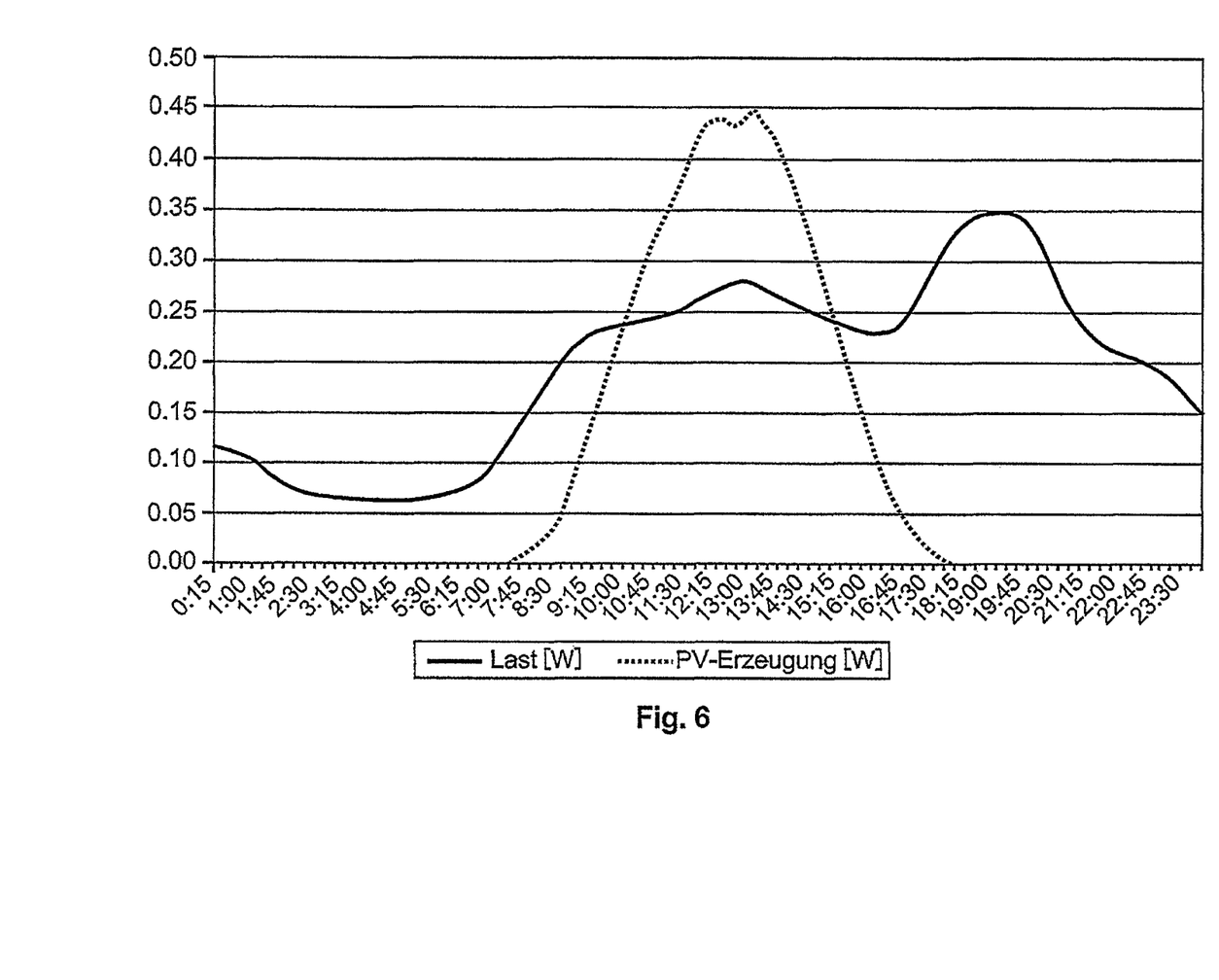
FIG. 6 shows mean power production and consumption.

The grid feed and consumption curves of a typical household are not parallel (FIG. 6). If the aim is to maximize own consumption, it is necessary either to change the terms and conditions of consumption or to use an appropriate storage medium. Another aspect, in Germany, is that the national grid is a three-phase grid with many terminal devices operated with three-phase current, whereas grid feed by consumer power plants is mainly done using single-phase string inverters.

FIG. 6 shows mean PV (photovoltaic) production of electricity and the mean load of a four-person household. The surplus photovoltaic output around midday can be clearly seen.

In order to optimize own consumption, one approach according to the invention involves no longer trying to feed produced photovoltaic energy directly and completely into the grid, but always to feed only that exact amount of photovoltaic electricity into the grid that is currently being consumed, and to store any surplus photovoltaic energy in intermediate storage.

In order to technically realize an effective solution using storage, it is necessary to identify the requirements to be met by such a system. These requirements include the following:
Guaranteed battery life of 20 years
Low life-cycle costs
High cycle strength of the battery over its service life
High total efficiency of approx. 95%, including the battery
Small size, similar to a commercially available refrigerator
No operating risks
High level of reliability over the entire service life 5 kWp maximum output
5 kWh-8 kWh battery capacity
Maximum installation time: four hours.

These requirements are met by high-efficiency lithium-ion batteries, for example. The size of the storage means to be used is defined on the basis of various parameters, such as size of the photovoltaic system, level of own consumption, user's safety needs, cost-effectiveness, etc.

Figure 7:
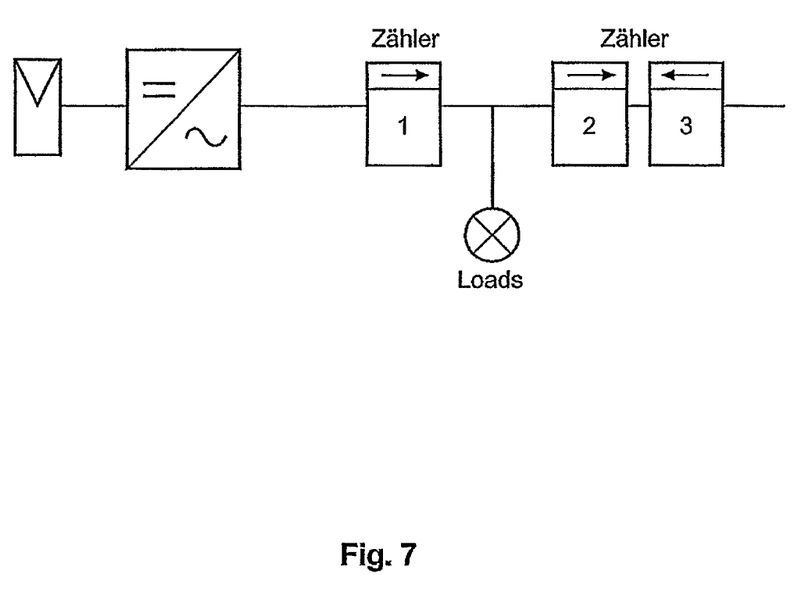
FIG. 7 shows a metering concept.

FIG. 7 shows a metering concept for determining own consumption of the energy generated. Meters 2 and 3 may be integrated in a single device.

The standalone grid according to the invention is able to provide the currently consumed amount of electricity simultaneously as required. The energy is supplied either directly from the photovoltaic system, from the storage unit or from a combination of both sources. Only when insufficient energy can be supplied from these sources is use made of grid power in order to cover short-term increases in requirements, for example. If the grid is not available due to failure, the system is able to store generated electricity and/or, as a backup, to supply power from the two sources as required, up to a defined amount.

Figure 8:
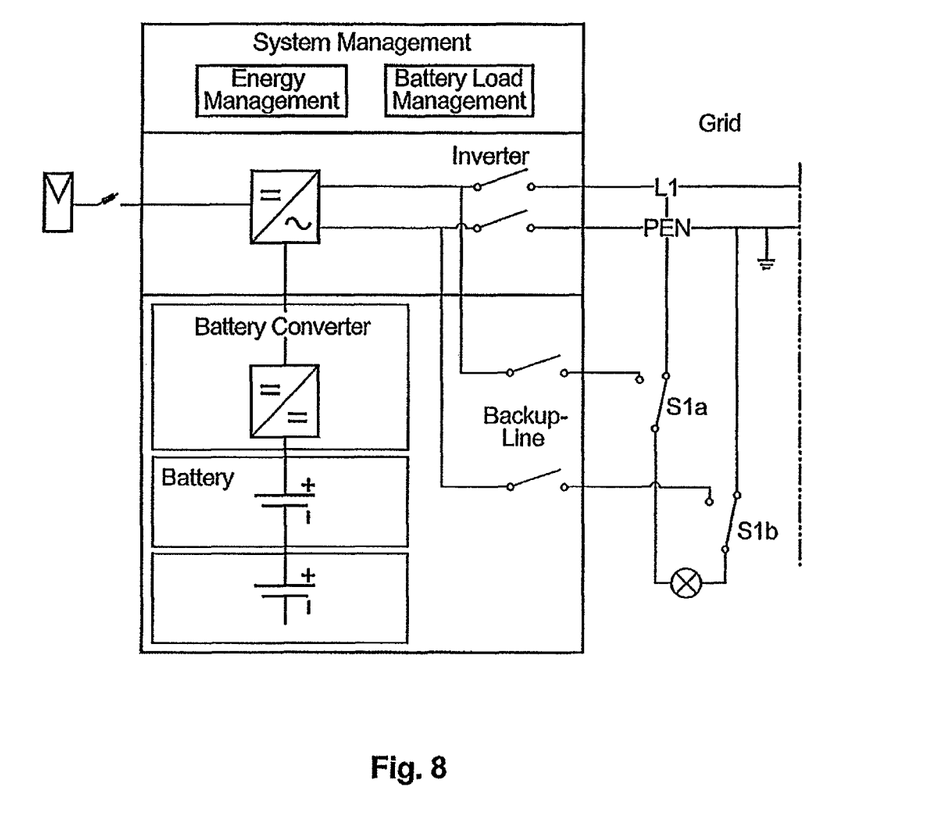
FIG. 8 shows a circuit of a power control device according to the invention.

FIG. 8 illustrates an embodiment according to the invention. The inverter, battery charger and battery module are integrated in a single device. In addition, a backup line is provided which can supply to loads up to a defined amount, as required, in the event of a power failure.

FIG. 8 shows a schematic view of a standalone grid according to the invention, for optimizing own consumption with the support of photovoltaic power. The standalone grid integrates the inverter, battery module and battery charger in a single device. In addition to the normal connection for grid feed, an additional connection for emergency power supply is provided. Switches S1a and S1b are used to connect and disconnect loads to the emergency power supply and can be operated by an energy management system.

The power control device according to the invention also includes an intelligent system management system which regulates and monitors the flows of energy and the operation of the components. The energy management system does this by measuring the current load on all three phases in order to determine the level of power to be provided by the inverter.

Parallel to this, the battery converter, which is a charge controller with a very high efficiency factor, stores any surplus photovoltaic electricity in the battery, or draws from the battery the difference between photovoltaic electricity and the amount of power to be supplied. The power control device compensates the highly dynamic fluctuations in power output that are characteristic of photovoltaic electricity and supports the inverter in providing the exact amount of power.

Figure 9:
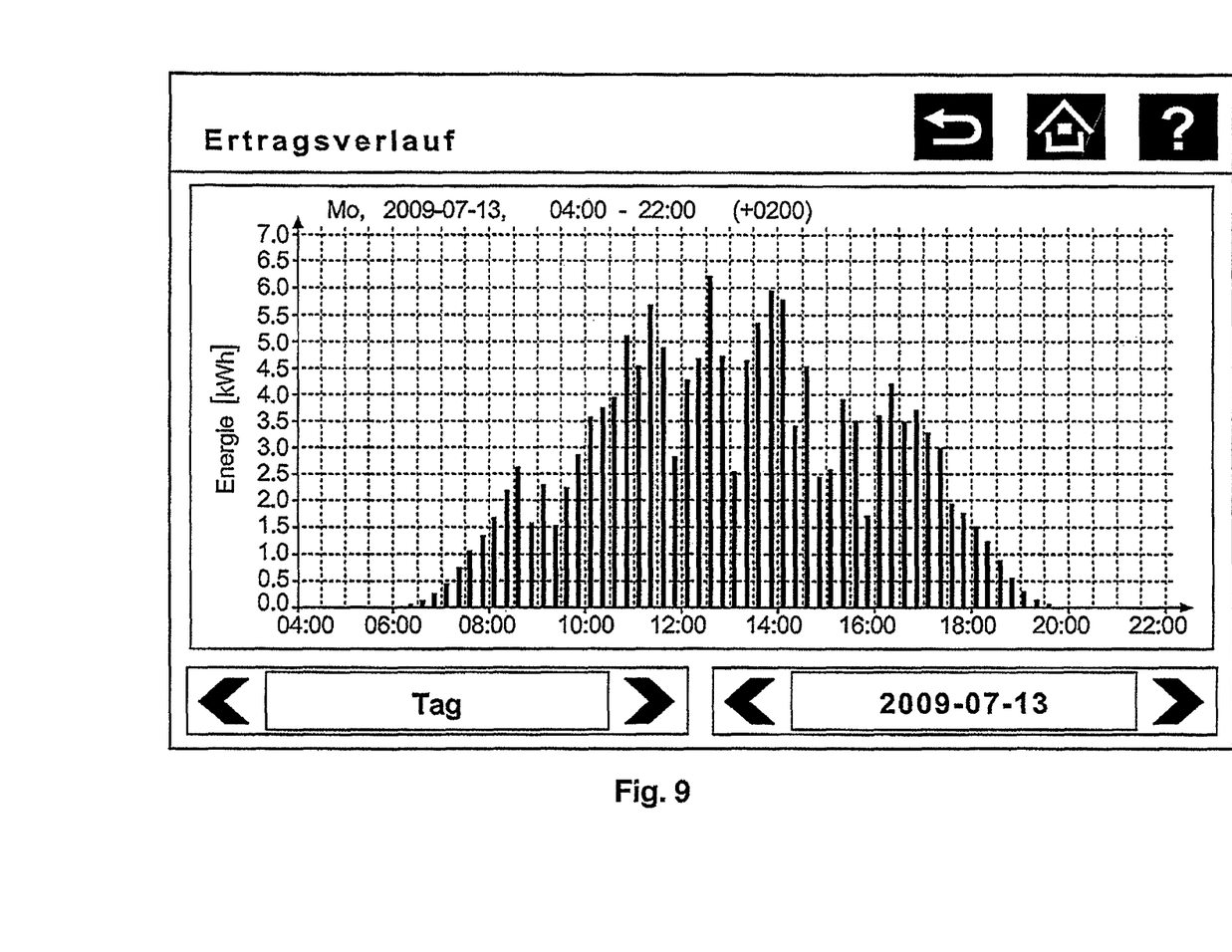
FIG. 9 shows a display of a power control device.

The system is equipped with a display for showing the user and the fitter key information about the electricity being produced, stored and internally consumed (FIG. 9). In this way, the system permits a high level of transparency with regard to the performance of the proprietary plant and provides the fitter with important details about system performance and supports him when performing any maintenance work that may be needed.

FIG. 9 shows system performance information as provided by the display.

The present invention incorporates many solutions that provide the user of the power control device with totally new ways of managing energy intelligently. The system is also built according to the construction kit principle, which means that it can be installed easily by a specialized fitter. Existing photovoltaic systems can also be retrofitted without difficulty.

I claim:

1. A power control device, comprising;
   a power generation unit which generates energy from renewable resources, the power generation unit adapted for installation at a location comprising a consumer unit;
   an energy storage unit which stores at least a portion of the energy generated by the power generation unit, the energy storage unit adapted for installation at the location along with the power generation unit;
   a measuring device for detecting the energy consumption of the consumer unit which consumes energy;
   a grid connection unit which connects the power control device to a public power grid, for drawing energy from the public power grid and for feeding energy into the public power grid; and
   a control unit which controls an energy flow between the power generation unit, the energy storage unit, the consumer unit and the public power grid,
   wherein the energy flow comprises a first energy flow from the power generation unit or the energy storage unit to the consumer unit, a second energy flow from the public power grid to the consumer unit, and a third energy flow from the power generation unit or the energy storage unit to the public power grid, wherein the first energy flow, the second energy flow, and the third energy flow are provided simultaneously.

2. The power control device of claim 1, wherein the control unit is adapted to bring about a flow of energy from the power generation unit to the energy storage unit when the energy produced exceeds the energy consumption of the consumer unit.

3. The power control device of any of the preceding claims, wherein the control device is adapted to bring about the flow of energy to the energy storage unit until the energy storage unit is charged completely or to a predetermined degree.

4. The power control device of claim 1, wherein the control device has a predictor unit for predicting the flow of energy to be controlled.

5. The power control device of claim 4, wherein the predictor unit is adapted to predict the energy consumption of the consumer unit on the basis of a reference period, information about times, days or seasons, or to predict the energy generated by the power generation unit on the basis of weather information, reference data or measurement data.

6. The power control device of claim 1, wherein the energy storage unit is connected by means of a first capacitor unit and a second capacitor unit to the power generation unit and to the grid connection unit.

7. The power control device of claim 6, wherein the power control device further comprises a charge controller for regulating the charging of an energy storage unit, wherein said charge controller comprises the first capacitor unit and is connected by means of the second capacitor unit to the power generation unit and to the grid connection unit.

8. The power control unit of claim 1, wherein the control unit is adapted to feed such an amount of energy into the public power grid as it draws from the public power grid.

9. The power control device of claim 1, further comprising a consumer connection unit for connecting the power control device to a consumer unit for the consumption of energy.

10. A method for controlling the operation of a power control device, comprising controlling, by a control unit of the power control device, an energy flow between a power generation unit, an energy storage unit, a consumer unit, and a public power grid according to an amount of energy consumed by the consumer unit, wherein the power generation unit is adapted to generate energy from a renewable energy source and is adapted for installation at a location comprising the consumer unit, wherein the energy storage unit is adapted to store at least a portion of the energy generated by the power generation unit and is adapted for installation at the location along with the power generation unit, wherein the control unit is adapted to control a flow of energy between the power generation unit and the public power grid such that for any period of time the nonzero amount of energy provided from the power generation unit to the public power grid is equal to the nonzero amount of energy drawn from the public power grid and consumed by the consumer unit.

11. The method of claim 10, wherein the method also includes controlling a flow of energy from the power generation unit to the energy storage unit if the energy produced exceeds the energy consumption of the consumer unit.

12. The method of claim 10 or 11, further comprising controlling a flow of energy to the energy storage unit until the energy storage unit is charged completely or to a predefined charge state.

13. The method of claim 10, further comprising:
predicting the energy consumption of the consumer unit on the basis of a reference period or information about times, days or seasons;
predicting the energy generated by the power generation unit on the basis of weather information, reference data or measurement data; and
controlling the flow of energy according to the predicted energy consumption and the predicted amount of energy generated.

14. The method of claim 10, wherein the method also includes feeding an amount of energy from the power generation unit and the energy storage unit into the public power grid that matches the amount of energy consumed by the consumer unit.

15. The method of claim 10, characterized in that such an amount of energy is fed into the public power grid as is drawn from the public power grid.

16. The power control device of claim 1, wherein the control unit is adapted to control a flow of energy from the power generation unit, from the energy storage unit, or both, to the public power grid in an amount that depends on the amount of energy that is drawn from the public power grid by the consumer unit.

17. The power control device of claim 1, wherein the control unit is adapted to control the flow of energy from the power generation unit, from the energy storage unit, or both, to the public power grid in an amount that is equal to the amount of energy that is drawn from the public power grid by the consumer unit.

18. The power control device of claim 1, wherein the control unit is adapted to control the flow of energy from the power generation unit, from the energy storage unit, or both, to the public power grid in an amount that is equal to the amount of energy that is drawn from the public power grid by the consumer unit by balancing a withdrawal of an amount of energy on one or more phases of a multiphase public power grid by feeding in the same amount of energy on one or more phases of the public power grid.

19. The method of claim 10, wherein the flow of energy from the power generation unit, from the energy storage unit, or both, to the public power grid is controlled to be an amount that depends on the amount of energy that is drawn from the public power grid by the consumer unit.

20. The method of claim 10, wherein the flow of energy from the power generation unit, from the energy storage unit, or both, to the public power grid is controlled to be an amount that is equal to the amount of energy that is drawn from the public power grid by the consumer unit by balancing a withdrawal of an amount of energy on one phase of the public power grid by feeding in the same amount of energy on another phase of the public power grid.

21. The method of claim 10, wherein the energy flow controlled by the control unit comprises a first energy flow from the power generation unit to the consumer unit, a second energy flow from the public power grid to the consumer unit, and a third energy flow from the power generation unit to the public power grid, wherein the first energy flow and the second energy flow are provided to the consumer unit at a same time, and wherein the third energy flow is equal to the second energy flow and is provided to the public power grid at also the same time.

* * * * *